United States Patent [19]
Suda

[11] Patent Number: 6,122,518
[45] Date of Patent: Sep. 19, 2000

[54] MOBILE COMMUNICATION SYSTEM INCLUDING BASE STATIONS EACH HAVING DEFINITE NUMBER OF TRAFFIC CHANNELS

[75] Inventor: Koji Suda, Tokyo, Japan

[73] Assignee: NEC Corporation, Tokyo, Japan

[21] Appl. No.: 09/113,356

[22] Filed: Jul. 10, 1998

[30] Foreign Application Priority Data

Jul. 11, 1997 [JP] Japan ................................ 9-186584

[51] Int. Cl.[7] .................................................. H09Q 7/20
[52] U.S. Cl. .......................... 455/450; 455/452; 455/450
[58] Field of Search ................................. 455/450, 455, 455/464, 509, 514, 516, 62, 67.1, 553, 186.1, 434, 435, 452

[56] References Cited

FOREIGN PATENT DOCUMENTS

| | | |
|---|---|---|
| 4-236597 | 8/1992 | Japan . |
| 5-284097 | 10/1993 | Japan . |
| 6-351057 | 12/1994 | Japan . |

*Primary Examiner*—Reinhard J. Eisenzopf
*Assistant Examiner*—N. Mehrpour
*Attorney, Agent, or Firm*—Foley & Lardner

[57] ABSTRACT

In a mobile communication system including a switching network and at least one base station operatively connected to the switching network, the base station having a definite number of traffic channels, a memory stores information regarding whether each of the traffic channels is non-free, a data-free or speech-free. A control unit compares information transfer capability included in a call set-up message from one mobile station or to the mobile station with the information of the memory and sets up a call connection between the mobile station and one of the traffic channels in accordance with the result of the comparison.

8 Claims, 9 Drawing Sheets

Fig. 3

|  | ITC |
|---|---|
| SPEECH INFORMATION | 0 0 0 0 0 |
| UNRESTRICTED DIGITAL INFORMATION | 0 1 0 0 0 |

Fig. 4

| PHS BS | TRAFFIC CHANNEL | REGULATION | STATE |
|---|---|---|---|
| 2-1 | CH1 | NON-FREE | OCCUPIED |
| | CH2 | NON-FREE | VACANT |
| | CH3 | DATA-FREE | VACANT |
| 2-2 | CH1 | NON-FREE | OCCUPIED |
| | CH2 | DATA-FREE | OCCUPIED |
| | CH3 | SPEECH-FREE | OCCUPIED |
| ⋮ | ⋮ | ⋮ | ⋮ |

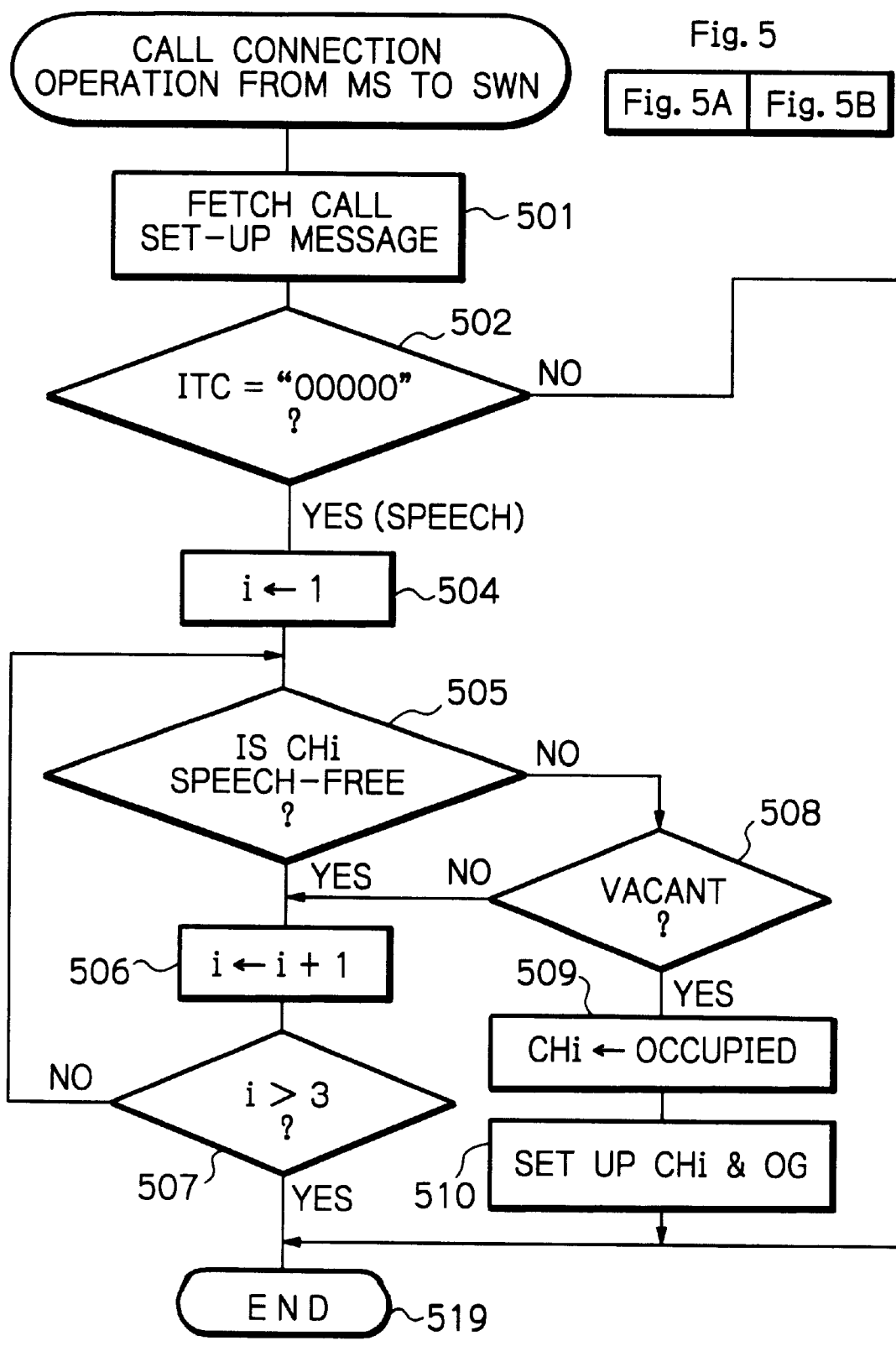

Fig. 6A

| TRAFFIC CHANNEL | REGULATION | STATE |
|---|---|---|
| CH 1 | NON-FREE | OCCUPIED |
| CH 2 | NON-FREE | VACANT |
| CH 3 | DATA-FREE | VACANT |

(MS6-1)

Fig. 6B 

| TRAFFIC CHANNEL | REGULATION | STATE |
|---|---|---|
| CH 1 | NON-FREE | OCCUPIED |
| CH 2 | NON-FREE | OCCUPIED |
| CH 3 | DATA-FREE | VACANT |

(MS6-2)

Fig. 6C 

| TRAFFIC CHANNEL | REGULATION | STATE |
|---|---|---|
| CH 1 | NON-FREE | OCCUPIED |
| CH 2 | NON-FREE | OCCUPIED |
| CH 3 | DATA-FREE | VACANT |

Fig. 6D 

| TRAFFIC CHANNEL | REGULATION | STATE |
|---|---|---|
| CH 1 | NON-FREE | OCCUPIED |
| CH 2 | NON-FREE | OCCUPIED |
| CH 3 | DATA-FREE | OCCUPIED |

(MS6-4)

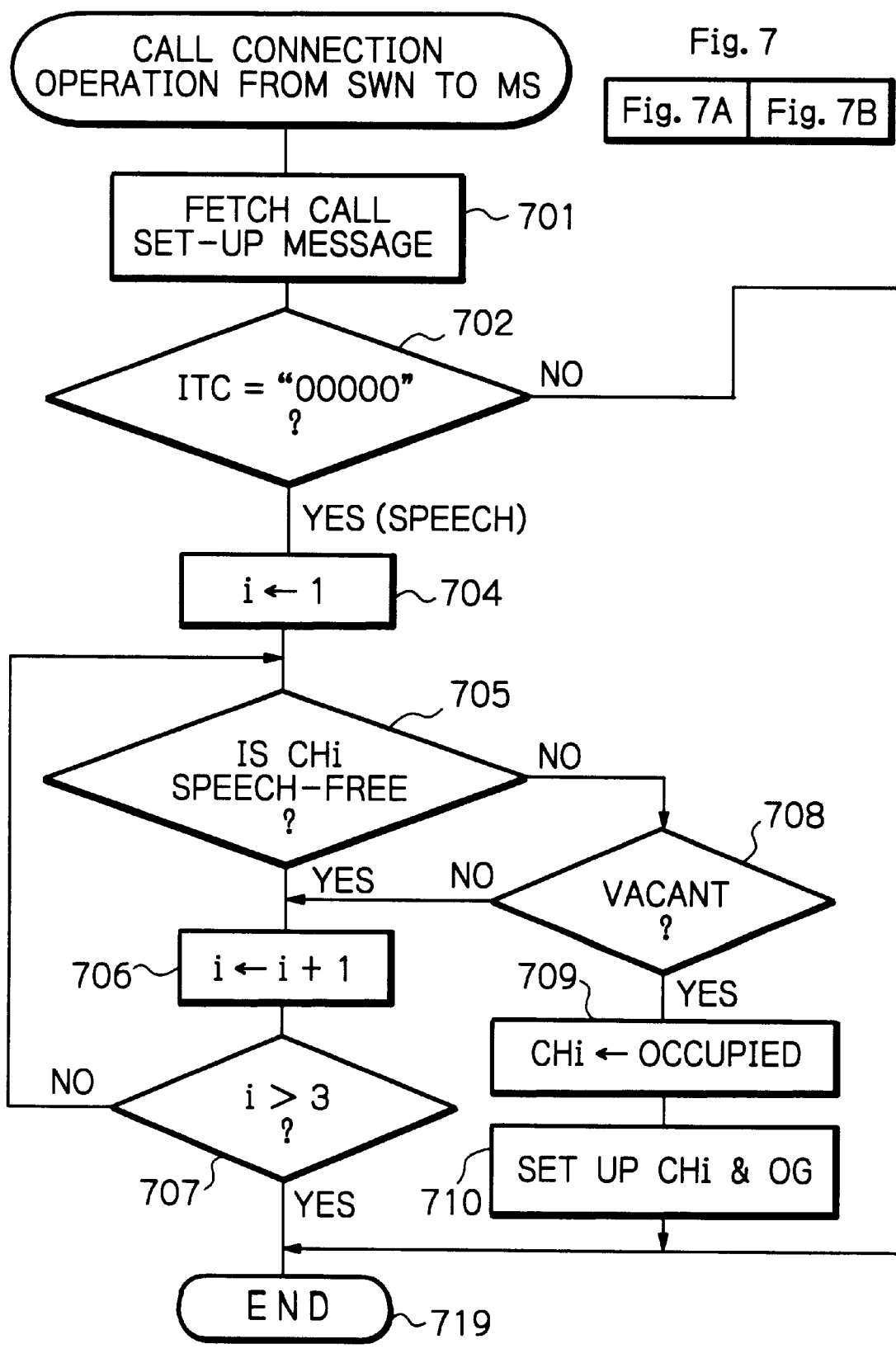

Fig. 8A

| TRAFFIC CHANNEL | REGULATION | STATE |
|---|---|---|
| CH 1 | NON-FREE | OCCUPIED |
| CH 2 | NON-FREE | VACANT |
| CH 3 | DATA-FREE | VACANT |

(MS6-1)

Fig. 8B

| TRAFFIC CHANNEL | REGULATION | STATE |
|---|---|---|
| CH 1 | NON-FREE | OCCUPIED |
| CH 2 | NON-FREE | OCCUPIED |
| CH 3 | DATA-FREE | VACANT |

(MS6-2)

Fig. 8C

| TRAFFIC CHANNEL | REGULATION | STATE |
|---|---|---|
| CH 1 | NON-FREE | OCCUPIED |
| CH 2 | NON-FREE | OCCUPIED |
| CH 3 | DATA-FREE | VACANT |

Fig. 8D

| TRAFFIC CHANNEL | REGULATION | STATE |
|---|---|---|
| CH 1 | NON-FREE | OCCUPIED |
| CH 2 | NON-FREE | OCCUPIED |
| CH 3 | DATA-FREE | OCCUPIED |

(MS6-4)

MOBILE COMMUNICATION SYSTEM INCLUDING BASE STATIONS EACH HAVING DEFINITE NUMBER OF TRAFFIC CHANNELS

BACKGROUND OF THE INVENTION

1. Field of the Invention

The present invention relates to a mobile communication system including base stations each having a definite number of traffic channels.

2. Description of the Related Art

In a prior art mobile communication system such as a prior art automatic private branch exchange (PBX) system, a plurality of personal handyphone system (PHS) basestations, i.e., cell stations (CSs) are connected to a switching network. In this case, in a coverage area of each of the PHS base stations, there are only three possible traffic channels where communication by speedch information and/or unrestricted digital information (UDI) is carried out. That is, three traffic channels and one signal channel are provided in one of the PHS base stations.

Note that speech information or unrestricted digital information depends upon the type of a mobile station, i.e., a person station (PS) such as a PHS cordless set.

Generally, since a speech information communication terminates in a short time, an all-busy state where all the channels of one PHS base station are occupied by speech information communications hardly continues for a long time. Therefore, if the number of installed PHS base stations is determined optimally in accordance with a call lost probability based upon speech information communications, it is possible to avoid such an all-busy state by speech information communications.

On the other hand, an unrestricted digital information communication often continues for a long time. Therefore, even if the number of installed PHS base stations is determined optimally in accordance with a call lost probability based upon speech information communications, when some of the traffic channels of one PHS base station are occupied by unrestricted digital information communications, it is impossible for speech information communication to be carried out in a coverage area of this PHS base station.

SUMMARY OF THE INVENTION

It is an object of the present invention to reduce occurrences of an all-busy state of a base station having a definite number of traffic channels.

According to the present invention, in a mobile communication system including a switching network and at least one base station operatively connected to the switching network, the base stations having a definite number of traffic channels, a memory stores information regarding whether each of the traffic channels is non-free, data-free or speech-free. A control unit compares information transfer capability included in a call set-up message from one mobile station or to the mobile station with the information of the memory and sets up a call connection between the mobile station and one of the traffic channels in accordance with the result of the comparison.

BRIEF DESCRIPTION OF THE DRAWINGS

The present invention will be more clearly understood from the description as set forth below, with reference to the accompanying drawings, wherein:

FIG. 3 is a table showing examples of the information transfer ability of FIG. 2;

FIG. 4 is a table showing the content of the memory of FIG. 1;

FIGS. 5A and 5B is a flowcharts showing a call connection operation of the control unit of FIG. 1 from one mobile station to the time division switching network;

FIGS. 6A, 6B, 6C and 6D are diagrams of the content of the memory of FIG. 1 for explaining the flowchart of FIGS. 5A and 5B;

FIGS. 7A and 7B are flowcharts showing a call connection operation of the control unit of FIG. 1 from the time division switching network to one mobile station; and FIGS. 8A, 8B, 8C and 8D are diagrams of the content of the memory of FIG. 1 for explaining the flowcharts of FIGS. 7A and 7B.

DESCRIPTION OF THE PREFERRED EMBODIMENT

Figure 1:
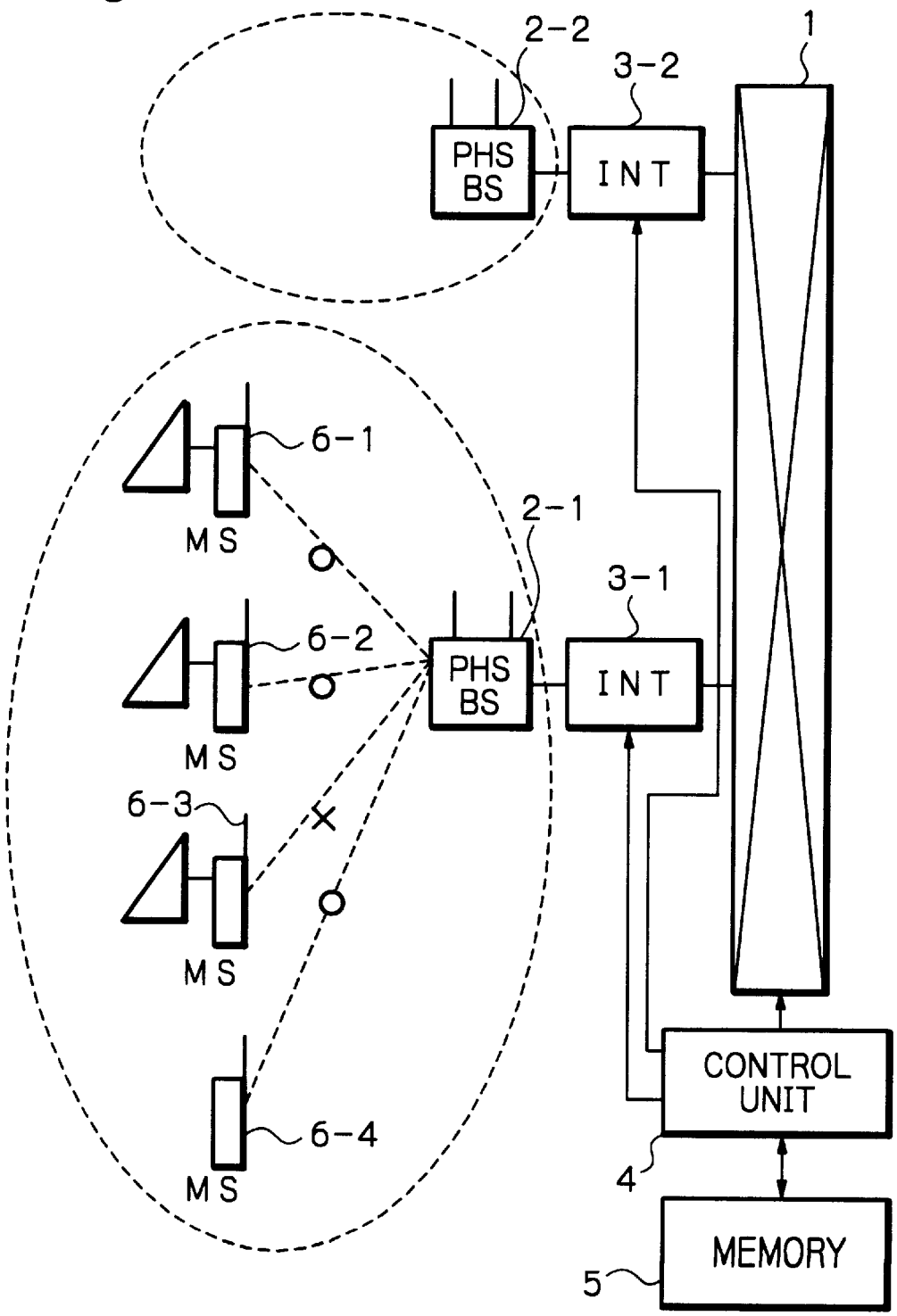
FIG. 1 is a block circuit diagram illustrating an embodiment of the mobile communication system according to the present invention.

In FIG. 1, which illustrates an embodiment of the mobile communication system according to the present invention, the mobile communication system is an automatic PBX system which is constructed by a time division switching network 1, PHS base stations 2-1, 2-2, . . . , and PHS base station interface units 3-1, 3-2, . . . connected between the time division switching network 1 and the PHS base stations 2-1, 2-2, . . . .

The time division switching network 1 and the PHS base station interface units 3-1, 3-2, . . . are controlled by a control unit 4 associated with a memory 5.

Each of the PHS base stations 2-1, 2-2, . . . has a coverage area where mobile stations for transmitting and receiving call control information on signal channels and information on traffic channels are located. For example, in the coverage area of the PHS base station 2-1, mobile stations 6-1, 6-2, 6-3 and 6-4 are located. In this case, each of the mobile stations 6-1, 6-2 and 6-3 is a PHS cordless set having a data terminal, and the mobile station 6-4 is a PHS cordless set specialized for a speech information communication.

The PHS base station interface units 3-1, 3-2, . . . transmit call control information on the signal channels to the control unit 4. Also, the PHS base station interface units 3-1, 3-2, . . . transmit information on traffic channels from the mobile stations, i.e., the PHS base stations 2-1, 2-2, . . . to the time division switching network 1, and vice versa.

The control unit 4 receives call control information from the PHS base interface units 3-1, 3-2, . . . as well as call control information from private lines and a public switched telephone network (not shown), and as a result, the control unit 4 controls the time division switching network 1 to carry out call control connection in accordance with the content of the memory 5.

Figure 2:
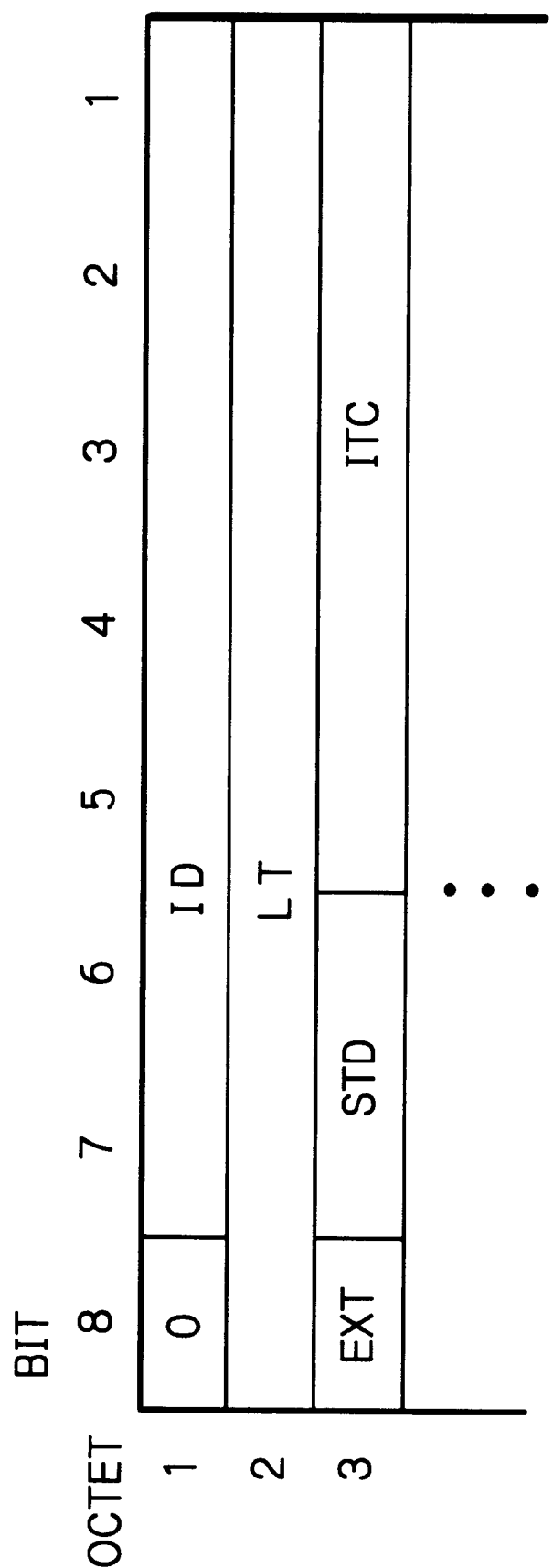
FIG. 2 is a frame format of call control information in the system of FIG. 1.

In FIG. 2, which shows a frame format of call control information (bearer capability) in the PHS communication, ID designates a transfer capability element identifier, LT designates a transfer capability bit length, EX designates an extension, STD designates a coding standard, and ITC designates an information transfer capability (see RCR STD-28). Also, as shown in FIG. 3, the information transfer ability ITC is "00000" for speech information, and "01000" for unrestricted digital information (also see RCR STD-28).

The memory 5 stores a table as shown in FIG. 4. That is, each of the PHS base stations 2-1, 2-2, . . . has only three traffic channels CH1, CH2 and CH3. Also, regulation states are allocated to all the channels in advance. The regulation states are a non-free state where speech information and unrestricted digital information are both available, a data-free state where only speech information is available, and a speech-free state where only unrestricted digital information is available. Further, the memory 5 stores an occupied or vacant state of each of the channels.

The operation of the control unit 4 where one of the mobile stations 6-1, 6-2, 6-3 and 6-4 generates a call set-up request within the coverage area of the PHS base station 2-1 will be explained next with reference to FIG. 5.

First, at step 501, the control unit 4 fetches a call set-up message from the PHS base station interface unit 3-1.

Next, at step 502, it is determined whether or not the information transfer capability ITC included in the call control information of the call set-up message is "00000". Also, at step 503, it is determined whether or not the information transfer capability ITC included in the call control information of the call set-up message is "01000". As a result, if ITC="00000" (speech information), the control proceeds to steps 504 through 510. If ITC="01000" (unrestricted digital information), the control proceeds to step 511 through 517. Otherwise the control proceeds to step 518. Note that the operation at step 518 can be arbitrarily designed.

Steps 504 through 510 are explained next.

As step 504, "i" is caused to be 1.

Next, at step 505, it is determined whether or not the regulation state of the channel Chi of the PHS base station 2-1 is "speech-free" by referring to the content of the memory 5. Only if it is "speech-free", does the control proceed to step 508. Otherwise, the operation at step 505 is repeated by steps 506 and 507 until "i" reaches 3.

At step 508, it is determined whether or not the state of the channel CHi of the PHS base station 2-1 is "vacant" by referring to the content of the memory 5. Only if it is "vacant", does the control proceed to step 509 which changes the state of the channel CHi of the PHS base station 2-1 from "vacant" to "occupied". Then, at step 510, the control unit 4 causes the PHS base station 2-1 to set up a call connection for the calling mobile station, and also, carries out a calling processing for a destination from the calling mobile station. Otherwise, the control proceeds to step 506.

Steps 511 through 517 are explained next.

As step 511, "i" is caused to be 1.

Next, at step 512, it is determined whether or not the regulation state of the channel CHi of the PHS base station 2-1 is "data-free" by referring to the content of the memory 5. Only if it is "data-free", does the control proceed to step 515. Otherwise, the operation at step 512 is repeated by steps 513 and 514 until "i" reaches 3.

At step 515, it is determined whether or not the state of the channel CHi of the PHS base station 2-1 is "vacant" by referring to the content of the memory 5. Only if it is "vacant", does the control proceed to step 516 which changes the state of the channel CHi of the PHS base station 2-1 from "vacant" to "occupied". Then, at step 517, the control unit 4 causes the PHS base station 2-1 to set up a call connection for the calling mobile station, and also, carries out a calling processing for a destination from the calling mobile station. Otherwise, the control proceeds to step 513.

Figure 5B:
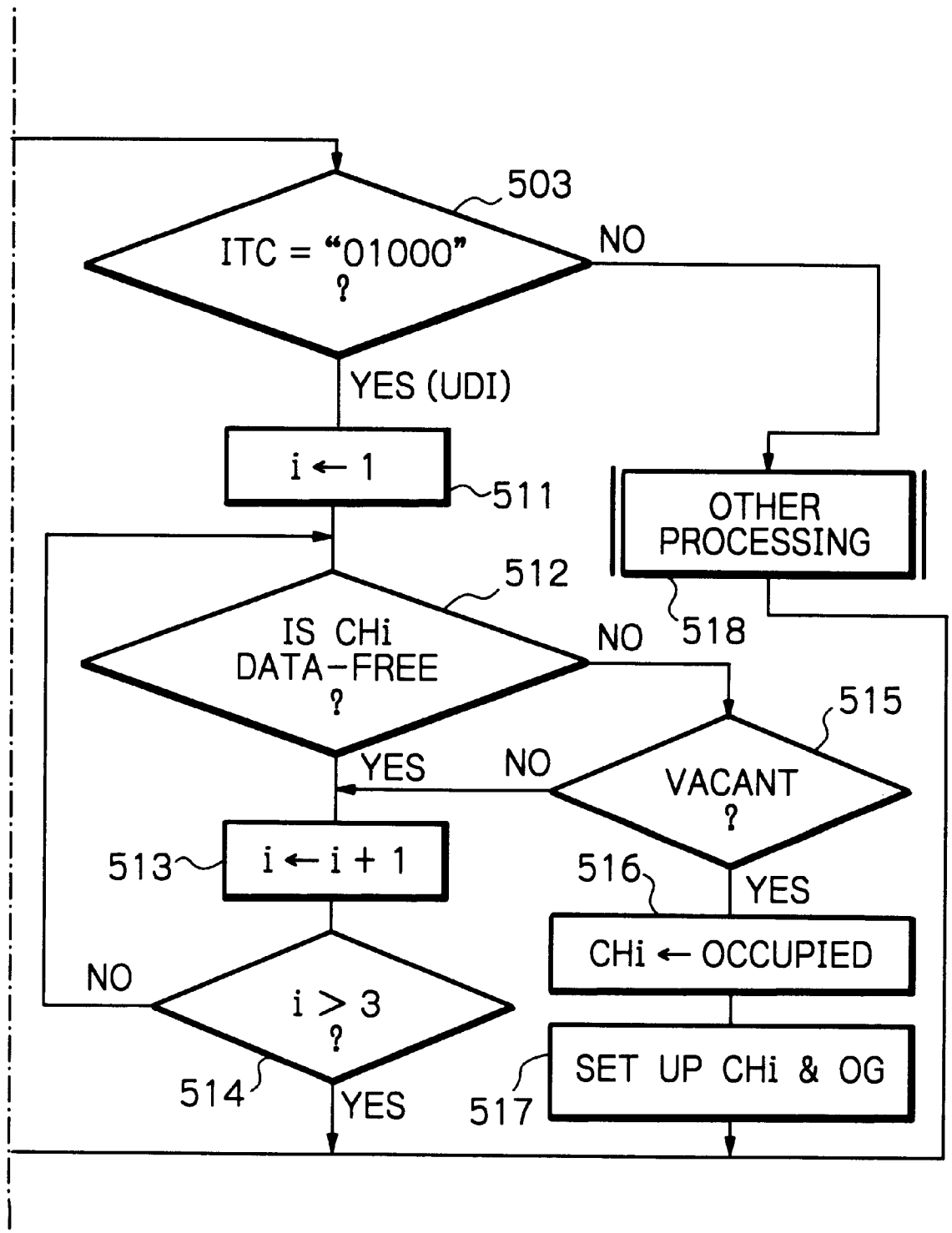

Then, the routine of FIG. 5 is completed by step 519.

An example of the operation of FIG. 5 is explained next with reference to FIGS. 6A, 6B, 6C and 6D.

Initially, as shown in FIG. 6A, assume that the channel CH1 of the PHS base station 2-1 is occupied by the mobile station 6-1.

Next, assume that the mobile station 6-2 requests a call set-up operation. In this case, although the channel CH1 of the PHS base station 2-1 is already occupied, the channel CH2 of the PHS base station 2-1 is "free" and "vacant", so that the control proceeds from step 502 via steps 504, 505 and 508 to steps 509 and 510. Thus, as shown in FIG. 6B, the channel CH2 of the PHS base station 2-1 is occupied by the mobile station 6-2.

Next, assume that the mobile station 6-3 requests a call set-up operation. In this case, although the channels CH1 and CH2 of the PHS base station 2-1 are already occupied, the channel CH3 of the PHS base station 2-1 is "data-free" and "vacant". Note that the mobile station 6-3 is a PHS cordless set having a data terminal. Therefore, the control proceeds from step 503 via steps 512, 513 and 514 to step 519. Thus, as shown in FIG. 6C, data communication from the mobile station 6-3 is regulated.

Next, assume that the mobile station 6-4 requests a call set-up operation. In this case, although the channels CH1 and CH2 of the PHS base station 2-1 are already occupied, the channel CH2 of the PHS base station 2-1 is "data-free" and "vacant". In this case, the mobile station 6-4 is a PHS cordless set specialized for a speech communication. Therefore, the control proceeds from step 502 via steps 504, 505 and 508 to steps 509 and 510. Thus, as shown in FIG. 6D, the channel CH3 of the PHS base station 2-1 is occupied by the mobile station 6-4.

The operation of the control unit 4 where a call is incoming to one of the mobile stations 6-1, 6-2, 6-3 and 6-4 within the coverage area of the PHS base station 2-1 will be explained next with reference to FIG. 7.

First, at step 701, the control unit 4 fetches a call set-up message from one of the private lines, the public switched telephone network, or the like.

Next, at step 702, it is determined whether or not the information transfer ability ITC included in the call control information of the call set-up message is "00000". Also, at step 703, it is determined whether or not the information transfer ability ITC included in the call control information of the call set-up message is "01000". As a result, if ITC="00000" (speech information), the control proceeds to steps 704 through 710. If ITC="01000" (unrestricted digital information), the control proceeds to step 711 through 717. Otherwise the control proceeds to step 718. Note that the operation at step 718 can be arbitrarily designed.

Steps 704 through 710 are explained next.

As step 704, "i" is caused to be 1.

Next, at step 705, it is determined whether or not the regulation state of the channel CHi of the PHS base station 2-1 is "speech-free" by referring to the content of the memory 5. Only if it is "speech-free", does the control proceed to step 708. Otherwise, the operation at step 705 is repeated by steps 706 and 707 until "i" reaches 3.

At step 708, it is determined whether or not the state of the channel CHi of the PHS base station 2-1 is "vacant" by referring to the content of the memory 5. Only if it is "vacant", does the control proceed to step 709 which changes the state of the channel CHi of the PHS base station 2-1 from "vacant" to "occupied". Then, at step 710, the control unit 4 causes the PHS base station 2-1 to set up a call connection for the called mobile station, and also, carries out a calling processing for a calling partner from the called mobile station. Otherwise, the control proceeds to step 706.

Steps 711 through 717 are explained next.

As step 711, "i" is caused to be 1.

Next, at step 712, it is determined whether or not the regulation state of the channel CHi of the PHS base station 2-1 is "data-free" by referring to the content of the memory 5. Only if it is "data-free", does the control proceed to step 715. Otherwise, the operation at step 712 is repeated by steps 713 and 714 until "i" reaches 3.

At step 715, it is determined whether or not the state of the channel CHi of the PHS base station 2-1 is "vacant" by referring to the content of the memory 5. Only if it is "vacant", does the control proceed to step 716 which changes the state of the channel CHi of the PHS base station 2-1 from "vacant" to "occupied". Then, at step 717, the control unit 4 causes the PHS base station 2-1 to set up a call connection for the called mobile station, and also, carries out a calling processing for a calling partner from the called mobile station. Otherwise, the control proceeds to step 713.

Figure 7B:
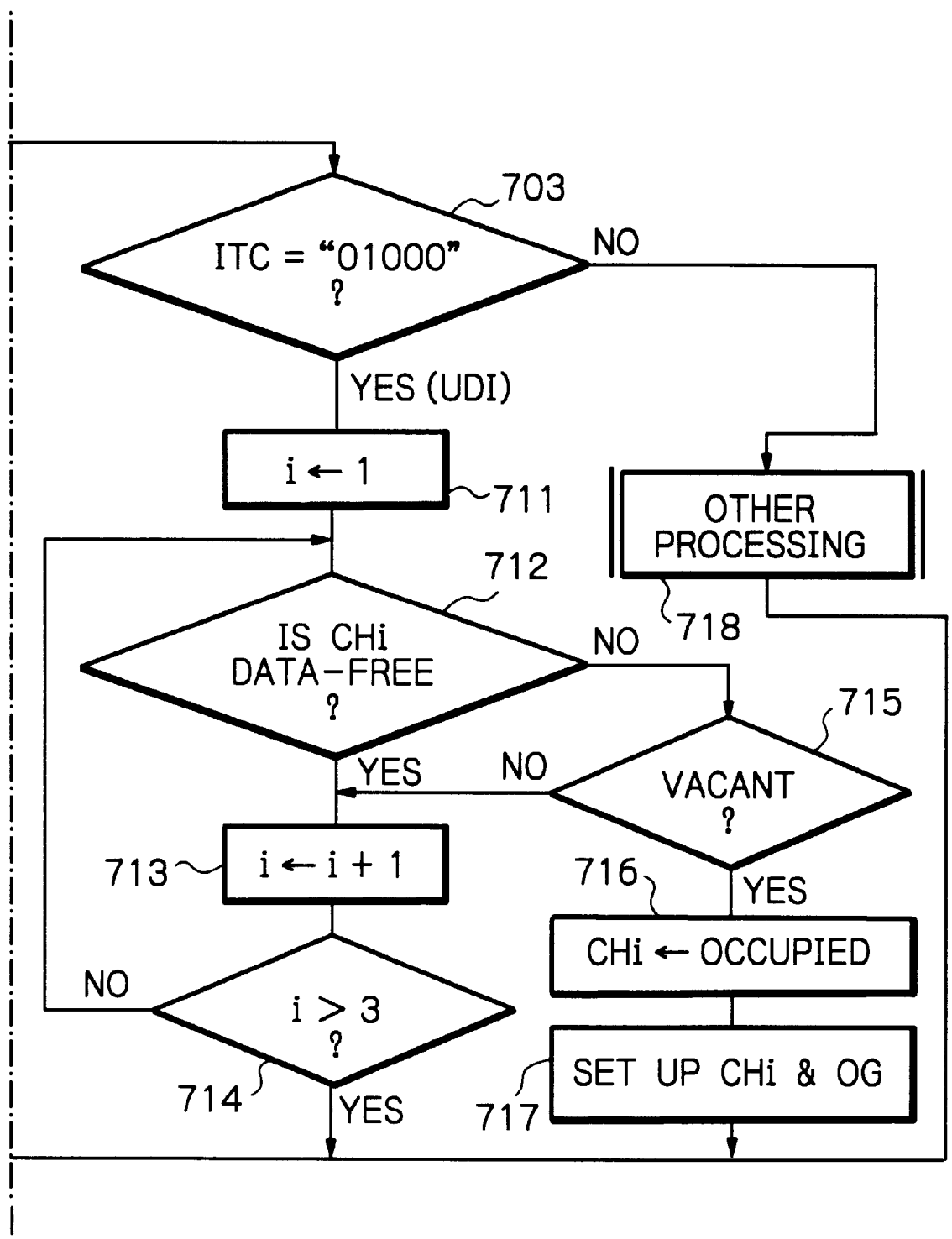

Then, the routine of FIG. 7 is completed by step 719.

An example of the operation of FIG. 7 is explained next with reference to FIGS. 8A, 8B, 8C and 8D.

Initially, as shown in FIG. 8A, assume that the channel CH1 of the PHS base station 2-1 is occupied by the mobile station 6-1.

Next, assume that a call is incoming to the mobile station 6-2. In this case, although the channel CH1 of the PHS base station 2-1 is already occupied, the channel CH2 of the PHS base station 2-1 is "free" and "vacant", so that the control proceeds from step 702 via steps 704, 705 and 708 to steps 709 and 710. Thus, as shown in FIG. 8B, the channel CH2 of the PHS base station 2-1 is occupied by the mobile station 6-2.

Next, assume that a call is incoming to the mobile station 6-3. In this case, although the channels CH1 and CH2 of the PHS base station 2-1 are already occupied, the channel CH3 of the PHS base station 2-1 is "data-free" and "vacant". Note that the mobile station 6-3 is a PHS cordless set having a data terminal. Therefore, the control proceeds from step 703 via steps 712, 713 and 714 to step 719. Thus, as shown in FIG. 8C, data communication for the mobile station 6-3 is regulated.

Next, assume that a call is incoming to the mobile station 6-4. In this case, although the channels CH1 and CH2 of the PHS base station 2-1 are already occupied, the channel CH2 of the PHS base station 2-1 is "data-free" and "vacant". In this case, the mobile station 6-4 is a PHS cordless set specialized for a speech communication. Therefore, the control proceeds from step 702 via steps 704, 705 and 708 to steps 709 and 710. Thus, as shown in FIG. 8D, the channel CH3 of the PHS base station 2-1 is occupied by the mobile station 6-4.

As explained hereinabove, according to the present invention, all the channels of one base station are never occupied by one kind of communication such as data communication or speech communication, which can provide a comfortable environment for the system.

What is claimed is:

1. A mobile communication system comprising;
    a switching network;
    at least one base station operatively connected to said switching network, said base station having a definite number of traffic channels;
    a memory for storing first information regarding whether each of said traffic channels is non-free, data-free or speech-free;
    a control unit, connected to said switching network and said memory and operatively connected to said base station, for comparing information transfer capability included in a call set-up message from one mobile station or to said mobile station with said first information of said memory and setting up a call connection between said mobile station and one of said traffic channels in accordance with a result of said comparison.

2. The system as set forth in claim 1, wherein, when said information transfer capability shows a speech information mode, said control unit sets up said call connection between said mobile station said one of said traffic channels only when said first information of said one of said traffic channel is non-free or data-free.

3. The system as set forth in claim 1, wherein, when said information transfer capability shows an unrestricted digital information mode, said control unit sets up said call connection between said mobile station said one of said traffic channels only when said first information of said one of said traffic channels in non-free or speech-free.

4. The system as set forth in claim 1, wherein said memory further stores second information regarding whether each of said traffic channels is vacant or occupied,
    said control unit setting up said call connection for said mobile station using said one of said traffic channels which is vacant, and changing said second information of said one of said traffic channels in said memory so that said one of said traffic channels is occupied.

5. A mobile communication system comprising:
    a switching network;
    at least one base station operatively connected to said switching network, said base station having a definite number of traffic channels;
    a memory for storing first information regarding whether each of said traffic channels is non-free, data-free or speech-free and second information regarding whether each of said traffic channels is vacant or occupied;
    a control unit, connected to said switching network and said memory and operatively connected to said base station,
    said control unit comprising:
        means for fetching information transfer capability included in a call set-up message from one mobile station or to said mobile station;
        means for searching one of said traffic channels in said memory;
        first means for determining whether or not said information transfer ability is regulated by said first information of said searched one of said traffic channels;
        second means for determining whether said searched one of said traffic channels is vacant by said second information of said searched one of said traffic channels;
        means for setting up a call connection between said mobile station and said searched one of said traffic channels only when said information transfer capability is not regulated and said searched one of said traffic channels is vacant; and
        means for changing said second information of said searched one of said traffic channels so that said searched one of said traffic channels is occupied, after said call connection sis et up.

6. The system as set forth in claim 5, wherein, when said information transfer capability shows a speech information mode, said first determining means determines that said information transfer capability is not regulated only when said first information of said one of said traffic channel is non-free or data-free.

7. The system as set forth in claim 5, wherein, when said information transfer capability shows an unrestricted digital information mode, said first determining means determines that said information transfer capability is not regulated only when said first information of said one of said traffic channels is non-free or speech-free.

8. The system as set forth in claim 5, further comprising a base station interface unit connected between said switching network and said base station.

* * * * *